Patented Jan. 15, 1924.

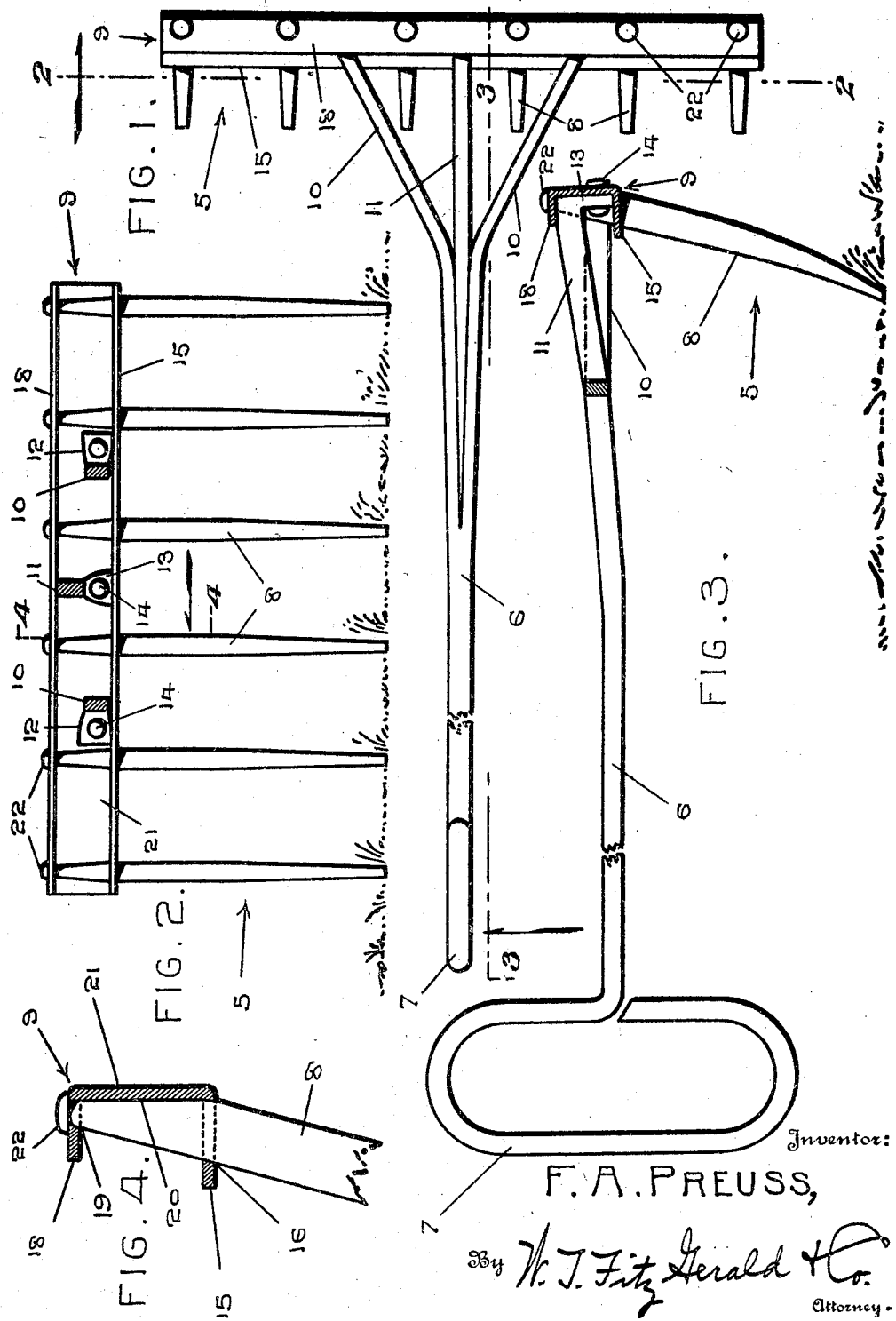

1,481,148

UNITED STATES PATENT OFFICE.

FRED A. PREUSS, OF HUMPHREY, NEBRASKA.

HOOKED FORK.

Application filed December 5, 1922. Serial No. 605,038.

*To all whom it may concern:*

Be it known that I, FRED A. PREUSS, a citizen of the United States, residing at Humphrey, in the county of Platte and State of Nebraska, have invented certain new and useful Improvements in Hooked Forks; and I do hereby declare the following to be a full, clear, and exact description of the invention, such as will enable others skilled in the art to which it appertains to make and use the same.

The present invention relates to an implement of general utility on a farm, and constitutes what may be called a "hooked fork," being a fork of hook form, whereby the tool is convenient and handy for digging potatoes, scraping corn cobs, straw and other material from the floor, raking corn into a sheller, and the like, this invention being an improvement over the implement disclosed in my application Serial No. 595,441, filed October 18, 1922.

It is the object of the invention to provide such an implement having its forked and hooked head of novel formation and construction to render the implement simple and efficient, and also substantial in construction.

Another object is the provision of such an implement in which the tines or prongs are secured to a cross bar or member in a novel manner to provide a rigid and durable structure.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of the implement.

Fig. 2 is a cross section on the line 2—2 of Fig. 1 giving a rear view of the head.

Fig. 3 is a longitudinal section on the line 3—3 of Fig. 1.

Fig. 4 is an enlarged sectional detail on the line 4—4 of Fig. 2.

A handle or shank 6 of suitable length is provided, having the hooked fork or head 5 at one end, and the hand-hold 7 at the opposite end. As shown, the handle or shank constitutes a metal rod, one end portion of which is bent to form the handhole 7 which is disposed in the vertical plane of said rod or shank 6.

The hooked fork or head 5 constitutes the tines or prongs 8 formed from bars or strips of sheet metal having their edges presented forwardly and rearwardly, and said tines or teeth are disposed in vertical planes parallel with the vertical plane of the shank or rod 6. Said tines or prongs have their upper terminals secured to a cross bar or member 9 secured to the forward end of the handle 6, and said cross bar or member is formed from sheet metal or channel iron with its flanges extending rearwardly.

The handle 6 is provided at its forward end with a fork having the diverging arms 10 and 11 extending to and abutting the bar or member 9. The ends of the side arms 10 have ears 12 bent side-wise toward the ends of the bar 9, while the end of the intermediate arm 10 has a downwardly bent ear 13, and said ears 12 and 13 abut the member 9 and are secured rigidly thereto by means of rivets 14 or the like. The intermediate arm 11 extends upwardly at an angle relative to the plane of the arms 10, whereby to brace the bar 9 against displacement transversely thereof relatively to the handle, while the arms 10 brace the bar 9 against angular displacement relatively to the handle in the plane of said handle and bar. The bar 9 is thus securely fastened to the handle to withstand the strains to which the parts are subjected, especially in rough usage, or when the prongs encounter unyielding objects.

In order to fasten the prongs or teeth to the bar or channel member 9, the lower rearwardly extending flange 15 of said bar has the openings 16 through which the upper terminals of the prongs 8 are inserted upwardly, and the upper rearwardly extending flange 18 of said bar has smaller openings or apertures 19 through which the upper reduced ends of the prongs extend. The upper flange 18 is preferably narrower than the lower flange 15, and the upper terminals of the prongs have oblique portions 20 facing forwardly to abut the web 21 of the bar 9, whereby when the prongs are forced upwardly into the bar, the surfaces 20 bind tightly against the web 21. The upper ends of the prongs are then battered or swaged down, as at 22, to seat on the flange 18, thereby securely fastening or anchoring the prongs to the bar, with the prongs fitted tightly in the openings 16 and 19 and bearing tightly against the web 21. The prongs are in inclined position, and extend downwardly and rearwardly from the bar 9, as seen in Figs. 3 and 4. The ears 12 and 13 of the arms or portions 10 and 11 are secured to the web 21 between the flanges 15 and 18. The head may have any number of prongs or tines, and the present implement is different from an ordinary garden or lawn rake, inasmuch as the head is relatively large and the prongs or teeth relatively long.

The implement thus provided can be conveniently and efficiently used for digging potatoes by a hoeing action, and may also be used for cultivating or working the soil. The device can also be used as a scraper or rake for scraping or raking corn cobs, straw and other material on the floor or ground, or for drawing corn into a sheller.

Having thus described the invention, what is claimed as new is:—

An implement of the character described comprising a channel-shaped bar having openings in its flanges, and prongs inserted longitudinally in said openings and having oblique surfaces to bear and bind against the web of the bar between said flanges, said prongs having portions bearing against one flange to hold said surfaces of the prongs tightly against said web.

In testimony whereof I have signed my name to this specification in the presence of two subscribing witnesses.

FRED A. PREUSS.

Witnesses:
    CHARLES PFEIFER,
    CHAS. J. STAPH.